US012588071B2

(12) United States Patent (10) Patent No.: US 12,588,071 B2
Lin (45) Date of Patent: Mar. 24, 2026

(54) APPARATUS AND METHOD OF WIRELESS COMMUNICATION

(71) Applicant: GUANGDONG OPPO MOBILE TELECOMMUNICATIONS CORP., LTD., Dongguan City (CN)

(72) Inventor: Hao Lin, Neuilly sur Seine (FR)

(73) Assignee: GUANGDONG OPPO MOBILE TELECOMMUNICATIONS CORP., LTD., Dongguan City (CN)

( * ) Notice: Subject to any disclaimer, the term of this patent is extended or adjusted under 35 U.S.C. 154(b) by 363 days.

(21) Appl. No.: 18/343,540

(22) Filed: Jun. 28, 2023

(65) Prior Publication Data

US 2023/0345546 A1 Oct. 26, 2023

Related U.S. Application Data

(63) Continuation of application No. PCT/IB2021/000059, filed on Jan. 13, 2021.

(51) Int. Cl.
*H04W 74/0833* (2024.01)

(52) U.S. Cl.
CPC ............................... *H04W 74/0833* (2013.01)

(58) Field of Classification Search
CPC ......................... H04W 74/0833; H04L 5/0007
See application file for complete search history.

(56) References Cited

U.S. PATENT DOCUMENTS

| 11,729,751 B2 * | 8/2023 | Park | H04W 72/0446 370/336 |
| 11,889,562 B2 * | 1/2024 | Shin | H04L 5/0053 |

| 2019/0274172 A1 | 9/2019 | Yoon | |
| 2019/0387546 A1 | 12/2019 | Li | |
| 2020/0137792 A1 * | 4/2020 | Yoon | H04W 74/006 |
| 2021/0352729 A1 * | 11/2021 | Sakhnini | H04W 74/0833 |
| 2022/0191936 A1 * | 6/2022 | Shin | H04W 74/004 |
| 2025/0039947 A1 * | 1/2025 | Shin | H04L 27/26 |

FOREIGN PATENT DOCUMENTS

| EP | 3732812 B1 * | 3/2024 | H04W 48/08 |
| WO | 2020167083 A1 | 8/2020 | |
| WO | 2020197351 A1 | 10/2020 | |
| WO | 2020167083 A8 | 8/2021 | |

OTHER PUBLICATIONS

International Search Report in the international application No. PCT/IB2021/000059, mailed on Oct. 22, 2021. 5 pages.
Written Opinion of the International Search Authority in the international application No. PCT/IB2021/000059, mailed on Oct. 22, 2021.8 pages.
3rd Generation Partnership Project; Technical Specification Group Radio Access Network; "Study on supporting NR from 52.6 GHz to 71 GHz (Release 17)", 3GPP TR 38.808 V0.2.0 (Nov. 2020), 161 pages.

* cited by examiner

*Primary Examiner* — Kevin T Bates
*Assistant Examiner* — Poonam Sharma
(74) *Attorney, Agent, or Firm* — PERKINS COIE LLP

(57) ABSTRACT

An apparatus and a method of wireless communication are provided. The method by a user equipment (UE) includes determining, by the UE, one or more random access channel (RACH) slots from one or more reference slots based on a reference subcarrier spacing (SCS), and performing an initial access according to one or more determined RACH slots.

18 Claims, 13 Drawing Sheets

200

202 — Determining, by the UE, one or more random access channel (RACH) slots from one or more reference slots based on a reference subcarrier spacing (SCS)

204 — Performing an initial access according to one or more determined RACH slots

30

200

202

204

300

302

Configuring a user equipment (UE) to determine one or more random access channel (RACH) slots from one or more reference slots based on a reference subcarrier spacing (SCS)

304

Controlling the UE to perform an initial access according to one or more determined RACH slots

| radio frame | | | | | | | | | |
|---|---|---|---|---|---|---|---|---|---|
| 0 | 1 | 2 | 3 | 4 | 5 | 6 | 7 | 8 | 9 |

10 subframes

FIG. 4 reference slot for RACH 60kHZ SCS

RACH slot 480kHz SCS reference slot for RACH 60kHZ SCS

RACH slot 480kHz SCS reference slot for RACH 60kHZ SCS

RACH slot 480kHz SCS reference slot for RACH 60kHZ SCS

RACH slot 480kHz SCS

RACH slot

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   | RO    || RO    || RO    || RO    ||   |    |    |    |    |

FIG. 10

RACH slot

| 0 | 1 | 2 | 3 | 4 | 5 | 6 | 7 | 8 | 9 | 10 | 11 | 12 | 13 |
|---|---|---|---|---|---|---|---|---|---|----|----|----|----|

| RO | RO | RO | RO |
|----|----|----|----|
| valid | invalid | valid | invalid |

FIG. 11

APPARATUS AND METHOD OF WIRELESS COMMUNICATION

CROSS-REFERENCE TO RELATED APPLICATION

The present application is a continuation of International Application No. PCT/IB2021/000059 filed on Jan. 13, 2021, the disclosure of which is hereby incorporated by reference in its entirety.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

An unlicensed spectrum is a shared spectrum. A communication device in different communication systems can use the unlicensed spectrum as long as the communication device meets regulatory requirements set by the country or region on the unlicensed spectrum and does not need to apply for a proprietary spectrum authorization from the government.

In order to allow various communication systems that use the unlicensed spectrum for wireless communication to coexist friendly in the unlicensed spectrum, some countries or regions specify regulatory requirements that must be met to use the unlicensed spectrum. For example, the communication device follows the principle of "a channel access procedure (or called a listen before talk (LBT) procedure", that is, the communication device needs to perform channel sensing before transmitting a signal on the channel. Only when the LBT outcome shows that the channel is idle, the communication device can perform signal transmission, or otherwise, the communication device cannot perform the signal transmission. In order to ensure fairness, once the communication device successfully occupies the channel, a transmission duration cannot exceed the maximum channel occupancy time (MCOT). The LBT mechanism is also called channel access procedure. In a new radio (NR) release 16 (R16), there are different types of channel access procedures, e.g. type 1, type 2A, type 2B, and type 2C channel access procedures as described in a third generation partnership project (3GPP) technical specification (TS) 37.213.

In new radio (NR) Release 15 and Release 16 systems, an operation frequency range is limited to below 52.6 GHz. To further boost a data throughput, future network can further envision using a higher frequency range, e.g. above 52.6 GHz. However, the current NR technology does not support this higher frequency range.

Therefore, there is a need for an apparatus (such as a user equipment (UE) and/or a base station) and a method of wireless communication, which can solve issues in the prior art, provide a method for random access channel (RACH) resource configuration and determination, provide a good communication performance, and/or provide high reliability.

SUMMARY

An object of the present disclosure is to propose an apparatus (such as a user equipment (UE) and/or a base station) and a method of wireless communication, which can solve issues in the prior art, provide a method for random access channel (RACH) resource configuration and determination.

In a first aspect of the present disclosure, a method of wireless communication by a user equipment (UE), comprising determining, by the UE, one or more random access channel (RACH) slots from one or more reference slots based on a reference subcarrier spacing (SCS), and performing an initial access according to one or more determined RACH slots.

In a second aspect of the present disclosure, a method of wireless communication by a base station comprising configuring a user equipment (UE) to determine one or more random access channel (RACH) slots from one or more reference slots based on a reference subcarrier spacing (SCS), and controlling the UE to perform an initial access according to one or more determined RACH slots.

In a third aspect of the present disclosure, a user equipment comprises a memory, a transceiver, and a processor coupled to the memory and the transceiver. The processor is configured to determine one or more random access channel (RACH) slots from one or more reference slots based on a reference subcarrier spacing (SCS) and the processor is configured to perform an initial access according to one or more determined RACH slots.

In a fourth aspect of the present disclosure, a base station comprises a memory, a transceiver, and a processor coupled to the memory and the transceiver. The processor is configured to determine one or more random access channel (RACH) slots from one or more reference slots based on a reference subcarrier spacing (SCS) and the processor is configured to perform an initial access according to one or more determined RACH slots.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 4 is a schematic diagram illustrating a radio frame comprising 10 subframes according to an embodiment of the present disclosure.

FIG. 10 is a schematic diagram illustrating that in a RACH slot, a RACH occasion (RO) starts from orthogonal frequency division multiplexing (OFDM) symbol index 1 and a RO duration is 2 OFDM symbols and there are 4 ROs according to an embodiment of the present disclosure.

FIG. 11 is a schematic diagram illustrating that valid RO and invalid RO are staggered in time domain according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
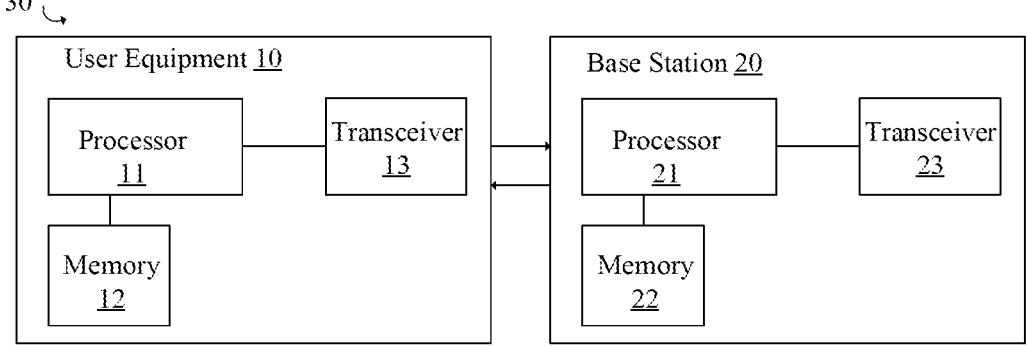
FIG. 1 is a block diagram of one or more user equipments (UEs) and a base station (e.g., gNB or eNB) of communication in a communication network system according to an embodiment of the present disclosure.

FIG. 1 illustrates that, in some embodiments, one or more user equipments (UEs) 10 and a base station (e.g., gNB or eNB) 20 for transmission adjustment in a communication network system 30 (e.g., non-terrestrial network (NTN) or terrestrial network) according to an embodiment of the present disclosure are provided. The communication network system 30 includes the one or more UEs 10 and a base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine one or more random access channel (RACH) slots from one or more reference slots based on a reference subcarrier spacing (SCS) and the processor 11 is configured to perform an initial access according to one or more determined RACH slots. This can solve issues in the prior art, provide a method for random access channel (RACH) resource configuration and determination, provide a good communication performance, and/or provide high reliability.

In some embodiments, the processor 21 is configured to determine one or more random access channel (RACH) slots from one or more reference slots based on a reference subcarrier spacing (SCS) and the processor 21 is configured to perform an initial access according to one or more determined RACH slots. This can solve issues in the prior art, provide a method for random access channel (RACH) resource configuration and determination, provide a good communication performance, and/or provide high reliability.

Figure 2:
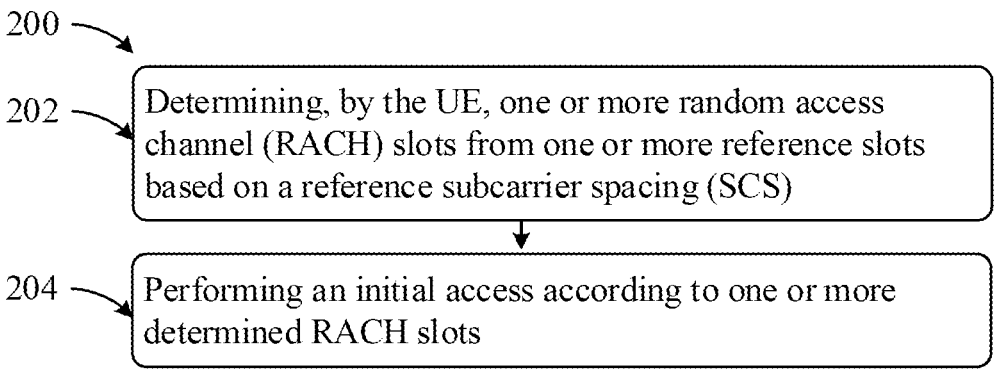
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, determining, by the UE, one or more random access channel (RACH) slots from one or more reference slots based on a reference subcarrier spacing (SCS), and a block 204, performing an initial access according to one or more determined RACH slots. This can solve issues in the prior art, provide a method for random access channel (RACH) resource configuration and determination, provide a good communication performance, and/or provide high reliability.

Figure 3:
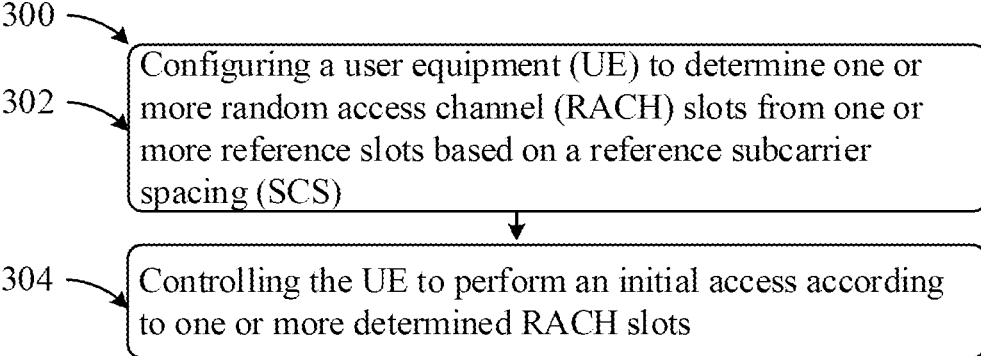
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, configuring a user equipment (UE) to determine one or more random access channel (RACH) slots from one or more reference slots based on a reference subcarrier spacing (SCS), and a block 304, controlling the UE to perform an initial access according to one or more determined RACH slots. This can solve issues in the prior art, provide a method for random access channel (RACH) resource configuration and determination, provide a good communication performance, and/or provide high reliability.

In some embodiments, the reference SCS is equal to at least one of the followings: 60 kHz, 120 kHz, 480 kHz, or 960 kHz. In some embodiments, the reference SCS is pre-defined or pre-configured. In some embodiments, the reference SCS corresponds to an operational frequency range. In some embodiments, the operational frequency range is equal to or greater than 52.6 GHz or equal to or less than 71 GHz. In some embodiments, the one or more reference slots are obtained from one or more configured subframes in a frame and the reference SCS. In some embodiments, the one or more configured subframes in new radio (NR) have a pre-defined SCS equal to 15 kHz. In some embodiments, the frame is a radio frame and comprises 10 subframes. In some embodiments, the one or more configured subframes are configured by a base station for RACH. In some embodiments, the UE is configured to determine that the one or more reference slots are overlapped with the configured one or more subframes.

In some embodiments, the UE is configured to determine that the one or more reference slots are overlapped with the configured one or more subframes according to the reference SCS. In some embodiments, the UE is configured to determine that the one or more RACH slots are overlapped with the one or more reference slots. In some embodiments, the UE is configured to determine that the one or more RACH slots are overlapped with the one or more reference slots according to a SCS of the one or more RACH slots. In some embodiments, the SCS of the one or more RACH slots is equal to 120 kHz, 480 kHz, or 960 kHz, and/or the SCS of the one or more reference slots is equal to 60 kHz or 120 kHz. In some embodiments, when the SCS of the one or more reference slots is equal to 60 kHz and the SCS of the one or more RACH slots is equal to 120 kHz, one reference slot length corresponds to 32 RACH slots, when the SCS of the one or more reference slots is equal to 120 kHz and the SCS of the one or more RACH slots is equal to 120 kHz, one reference slot length corresponds to 16 RACH slots, when the SCS of the one or more reference slots is equal to 60 KHz and the SCS of the one or more RACH slots is equal to 480 kHz, one reference slot length corresponds to 8 RACH slots, when the SCS of the one or more reference slots is equal to 120 kHz and the SCS of the one or more RACH slots is equal to 480 kHz, one reference slot length corresponds to 4 RACH slots, when the SCS of the one or more reference slots is equal to 60 kHz and the SCS of the one or more RACH slots is equal to 960 kHz, one reference slot length corresponds to 4 RACH slots, and/or when the SCS of the one or more reference slots is equal to 120 kHz and the SCS of the one or more RACH slots is equal to 960 kHz, one reference slot length corresponds to 2 RACH slots.

In some embodiments, the one or more RACH slots are completely or partially overlapped with the one or more reference slots. In some embodiments, when one reference slot corresponds more than one RACH slot, the UE selects a part of slots as the one or more RACH slots within a reference slot range. In some embodiments, the part of the slots comprises a first or second half number of slots as the one or more RACH slots overlapping with the one or more reference slots. In some embodiments, the part of slots comprises non-consecutive slots as the one or more RACH slots in time domain overlapping with the one or more reference slots. In some embodiments, there is one slot interval defined between two RACH slots. In some embodiments, there is a number of interval slots defined between two RACH slots. In some embodiments, after determining the one or more RACH slots, the UE further determines one or more RACH occasions (ROs). In some embodiments, each of the one or more ROs comprises one or more orthogonal frequency division multiplexing (OFDM) symbols within the one or more RACH slots.

In some embodiments, each of the one or more RACH slot comprise 14 OFDM symbols. In some embodiments, the UE is configured to determine the one or more ROs by at least one of the following parameters: a first RO starting symbol, a RO duration, or a number of RO in one RACH slot. In some embodiments, the UE is configured to determine an interval between two ROs. In some embodiments, when the interval between two ROs is zero, the UE determines that the two ROs are consecutive in time domain. In some embodiments, when the interval between two ROs is non-zero, the UE determines that the two ROs are non-consecutive in time domain. In some embodiments, the UE is configured to determine a validation of the one or more ROs. In some embodiments, the UE is configured to determine that one or more valid ROs and one or more invalid ROs are staggered in time domain.

RACH Slot Determination:

In cellular system, when a UE intends to perform initial access, it needs to determine one or more RACH slots and further one or more RACH occasions (ROs). The determination of these parameters (RACH slot and RO) is based on system information. In some embodiments, the UE determines one or more RACH slots from one or more reference slots. In some embodiments, the one or more reference slots are based on a reference subcarrier spacing (SCS). In some embodiments, the reference SCS is equal to at least one of the followings: 60 kHz, 120 kHz, 480 kHz or 960 kHz. In some embodiments, the reference SCS is pre-defined or pre-configured. In some embodiments, the reference SCS corresponds to an operational frequency range. In some embodiments, the operational frequency range is equal to or greater than 52.6 GHz or equal to or less than 71 GHz. In some embodiments, the operational frequency range is above 52.6 GHz and/or below 71 GHz.

Example

One or more reference slots are obtained from one or more configured subframes and the reference SCS (or called a reference slot SCS). The one or more configured subframes in new radio (NR) have a pre-defined SCS equal to 15 kHz. A radio frame contains 10 subframes and the subframes are indexed from 0 to 9 as illustrated in FIG. 4.

Figure 5:
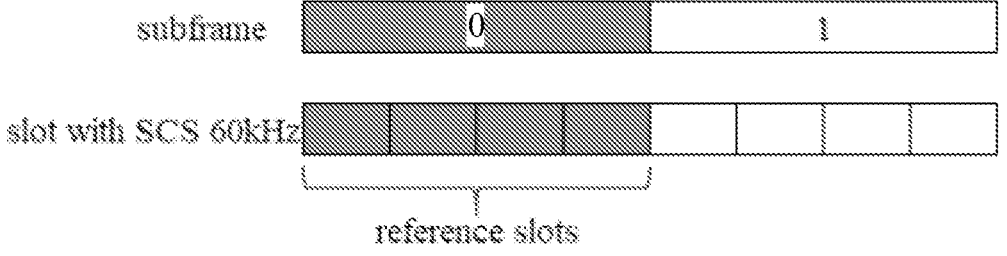
FIG. 5 is a schematic diagram illustrating reference random access channel (RACH) slots that are overlapped with configured one or more subframes according to an embodiment of the present disclosure.

A network or gNB may first configure one or more subframes for RACH. Then, the UE determines the one or more reference slots that are overlapped with the configured one or more subframes. As illustrated in FIG. 5, the gNB configures subframe 0 for RACH. Assuming the reference slot has a reference SCS equal to 60 kHz, the UE then determines the slots overlapping with the subframe 0 as the reference slots.

Figure 6:
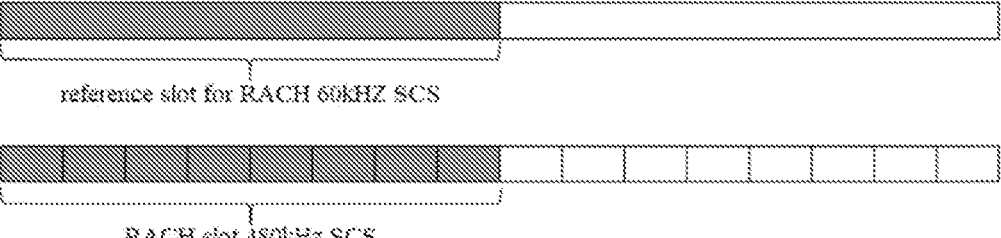
FIG. 6 is a schematic diagram illustrating that RACH slots SCS is 480 kHz, RACH slots are the ones overlapping with reference slots according to an embodiment of the present disclosure.

After determining the reference slots, the UE shall further determine the actual RACH slots. The RACH slots are obtained from the slots overlapping with the reference slots according to a SCS of the one or more RACH slots (or called a RACH slot SCS). Assuming the RACH slot SCS is equal to 480 kHz, the RACH slots are the ones overlapping with the reference slots as illustrated in FIG. 6. In some embodiments, when a reference slot has a reference SCS equal to 60 kHz and a RACH slot SCS is equal to 480 kHz, one reference slot length corresponds to 8 RACH slots. In some embodiments, the RACH slots are completely overlapped with the reference slots.

Figure 7:
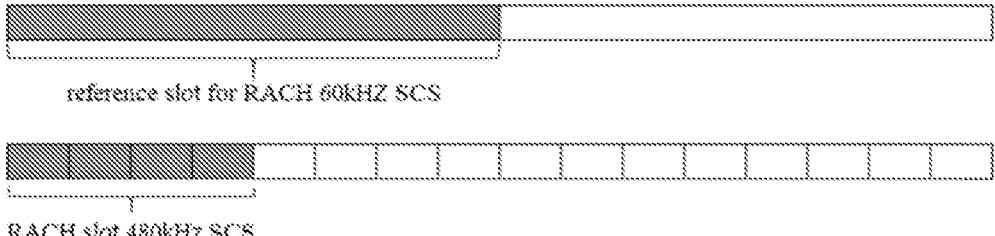
FIG. 7 is a schematic diagram illustrating that a part of slots may be the first half number of slots overlapping with reference slots according to an embodiment of the present disclosure.
Figure 8:
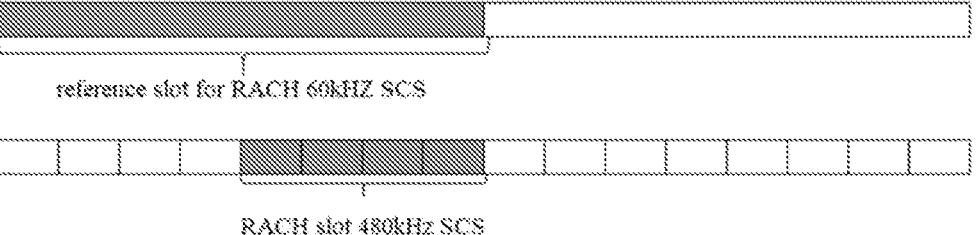
FIG. 8 is a schematic diagram illustrating that a part of slots may be the second half number of slots overlapping with reference slots according to an embodiment of the present disclosure.

Optionally, when a reference slot contains more than one RACH slot, the gNB may further configure the UE to select a part of the slots as the RACH slots within the reference slot range. In some examples, the part of the slots may be the first half number of slots overlapping with the reference slots as illustrated in FIG. 7. In some embodiments, the RACH slots are partially overlapped with the reference slots. In some examples, the part of the slots may be the second half number of slots overlapping with the reference slots as illustrated in FIG. 8.

Figure 9:
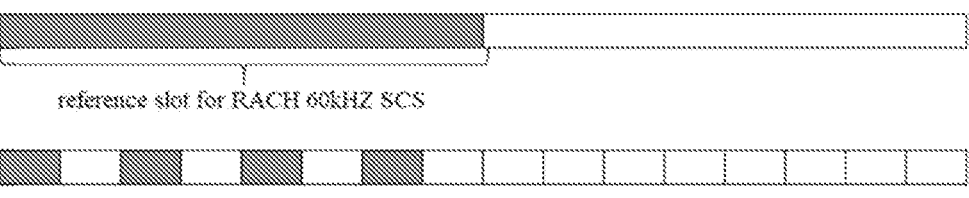
FIG. 9 is a schematic diagram illustrating that a part of slots may be non-consecutive slots in time domain overlapping with reference slots according to an embodiment of the present disclosure.

In some examples, the part of the slots may be non-consecutive slots in time domain overlapping with the reference slots as illustrated in FIG. 9, where in this example, between two RACH slots, there is one slot interval. In some examples, the gNB may further configure the number of interval slots between two RACH slots, e.g. the number of interval slot is 2 or 4, and so on.

It is to note that the gNB may configure the UE to select at least one of the above examples of the RACH slot determination options. In some examples, the reference slot SCS is pre-defined according to the operational frequency range. In some examples, the reference slot SCS is set to at least one of the followings: 60 kHz, 120 kHz, 480 kHz, or 960 kHz.

After determining the RACH slots, the UE shall further determine one or more RACH occasions (ROs). The RO is composed of one or more orthogonal frequency division multiplexing (OFDM) symbols within the RACH slots. For each RACH slot, there are 14 OFDM symbols. The UE determines the RO by at least one of the following parameters: first RO starting symbol, RO duration, or a number of RO in a RACH slot.

Figure 10:
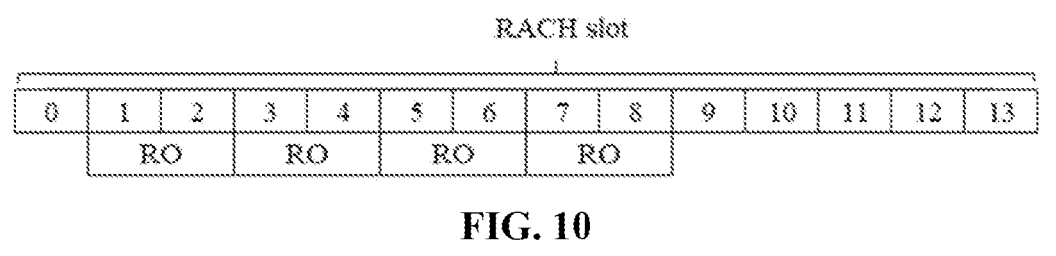

Example: the gNB configures that in a RACH slot, the RO starts from OFDM symbol index 1 and the RO duration is 2 OFDM symbols and there are 4 ROs as illustrated in FIG. 10. In this case, the UE will determine four consecutive ROs in a RACH slot, according to the RO duration, starting from OFDM symbol index 1.

Figure 11:
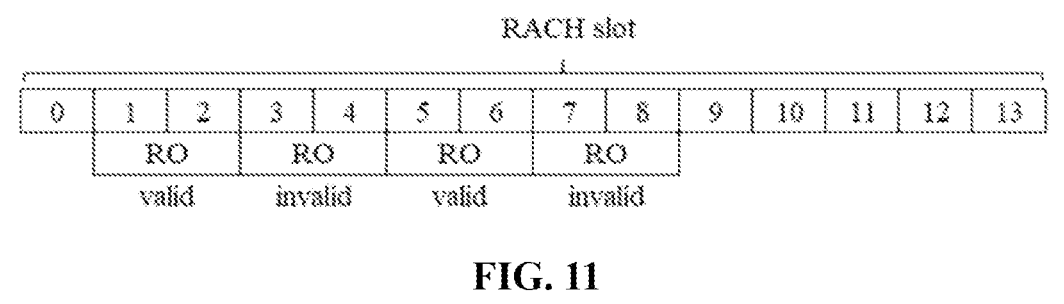

Optionally, after determining the ROs, the UE needs to further determine the valid RO. It means that not all the determined ROs are by default valid. One example is that the UE will only assume half of the determined ROs are valid by assuming RO as invalid every one consecutive ROs in a RACH slot as illustrated in FIG. 11. Valid RO and invalid RO are staggered in time domain. Such staggered validation will make ROs not consecutive in time domain, which is useful for operation in shared spectrum case, where invalid RO duration can be used for channel access procedure by the UE. At the same time, it still has a same RO configuration mechanism in both shared spectrum case and non-shared spectrum case. It is to note that for operation without shared spectrum, this staggered validation mechanism does not need to be used.

Figure 12:
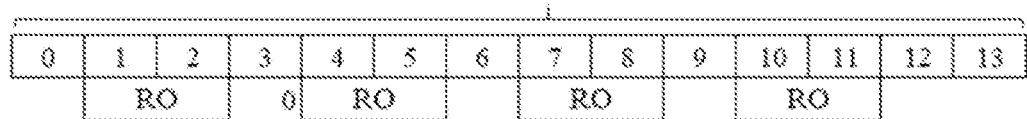
FIG. 12 is a schematic diagram illustrating that RO may be configured as non-consecutive in time domain according to an embodiment of the present disclosure.

Optionally, the RO may be configured as non-consecutive in time domain. An additional parameter, e.g. number of interval OFDM symbols, is used to be an interval between two ROs. When the number is zero, it means consecutive RO configuration, when the number is non-zero, it means non-consecutive RO configuration. Following the above example, if the number of the interval is 1 OFDM symbol, then the RO is determined as the FIG. 12. In some examples, the interval number is pre-defined or pre-configured.

In some embodiments, a channel refers to a carrier or a part of a carrier consisting of a contiguous set of resource blocks (RBs) on which a channel access procedure is performed in shared spectrum. In some embodiments, a channel access procedure is a procedure based on sensing that evaluates the availability of a channel for performing transmissions. The basic unit for sensing is a sensing slot with a duration $T_{sl}=9$ us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

Type 1 DL channel access procedures: This describes channel access procedures to be performed by an eNB/gNB where the time duration spanned by the sensing slots that are sensed to be idle before a downlink transmission(s) is random.

Type 2 DL channel access procedures: This describes channel access procedures to be performed by an eNB/gNB where the time duration spanned by sensing slots that are sensed to be idle before a downlink transmission(s) is deterministic.

Type 2A DL channel access procedures: An eNB/gNB may transmit a DL transmission immediately after sensing the channel to be idle for at least a sensing interval $T_{short\_dl}=25$ us. $T_{short\_dl}$ consists of a duration $T_f=16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

Type 2B DL channel access procedures: A gNB may transmit a DL transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

Type 2C DL channel access procedures: When a gNB follows the procedures in this clause for transmission of a DL transmission, the gNB does not sense the channel before transmission of the DL transmission. The duration of the corresponding DL transmission is at most 584 us.

Uplink channel access procedures: A UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures for the UE to access the channel(s) on which the transmission(s) are performed. If a UE fails to access the channel(s) prior to an intended UL transmission to a gNB, Layer 1 notifies higher layers about the channel access failure.

Type 1 UL channel access procedure: This describes channel access procedures by a UE where the time duration spanned by the sensing slots that are sensed to be idle before a UL transmission(s) is random.

Type 2 UL channel access procedure: This describes channel access procedures by UE where the time duration spanned by the sensing slots that are sensed to be idle before a UL transmission(s) is deterministic.

Type 2A UL channel access procedure: If a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul}=25$ us $T_{short\_ul}$ consists of a duration $T_f=16$ us immediately followed by one slot sensing slot and $T_f$ includes a sensing slot at start of $T_f$. The channel is considered to be idle for $T_{short\_ul}$ if both sensing slots of $T_{short\_ul}$, are sensed to be idle.

Type 2B UL channel access procedure: If a UE is indicated to perform Type 2B UL channel access procedures, the UE uses Type 2B UL channel access procedure for a UL transmission. The UE may transmit the transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

Type 2C UL channel access procedure: If a UE is indicated to perform Type 2C UL channel access procedures for a UL transmission, the UE does not sense the channel before the transmission. The duration of the corresponding UL transmission is at most 584 us. solve issues in the prior art, provide a method for random access channel (RACH) resource configuration and determination, provide a good communication performance, and/or provide high reliability Commercial interests for some embodiments are as follows. 1. Solving issues in the prior art. 2. Providing a method for random access channel (RACH) resource configuration and determination. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. The deployment scenarios include, but not limited to, indoor hotspot, dense urban, urban micro, urban macro, rural, factor hall, and indoor D2D scenarios. Some embodiments of the present disclosure are a combination of "techniques/processes" that can be adopted in 3GPP specification to create an end product. Some embodiments of the present disclosure could be adopted in 5G NR licensed and non-licensed or shared spectrum communications. Some embodiments of the present disclosure propose technical mechanisms.

Figure 13:
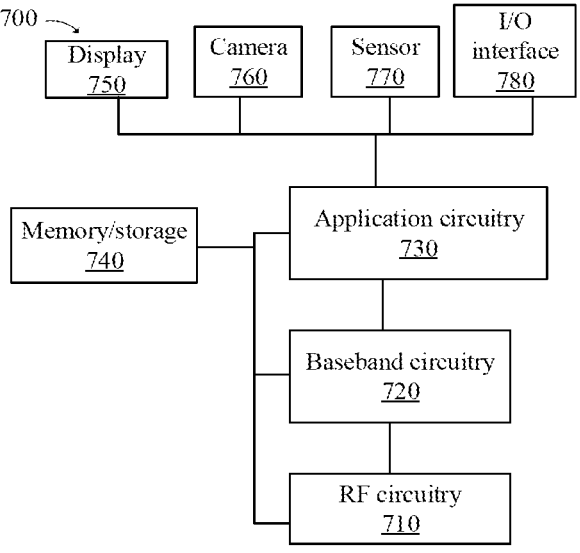
FIG. 13 is a block diagram of a system for wireless communication according to an embodiment of the present disclosure.

FIG. 13 is a block diagram of an example system 700 for wireless communication according to an embodiment of the present disclosure. Embodiments described herein may be implemented into the system using any suitably configured hardware and/or software. FIG. 13 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, performed by a user equipment (UE), comprising:

determining, by the UE, one or more reference slots from one or more configured subframes based on a reference subcarrier spacing (SCS) of the one or more reference slots;

determining, by the UE, one or more random access channel (RACH) slots from one or more reference slots based on a SCS of the one or more RACH slots; and performing an initial access according to one or more determined RACH slots.

2. The method of claim 1, wherein the reference SCS is equal to at least one of the followings: 60 kHz, 120 kHz, 480 kHz, or 960 kHz, and wherein the reference SCS corresponds to an operational frequency range and the operational frequency range is equal to or greater than 52.6 GHz or equal to or less than 71 GHz.

3. The method of claim 1, wherein the one or more configured subframes in new radio (NR) have a pre-defined SCS equal to 15 kHz and wherein the one or more configured subframes are configured by a base station for RACH.

4. The method of claim 1, wherein the UE is configured to determine that the one or more reference slots are overlapped with the one or more configured subframes according to the reference SCS.

5. The method of claim 1, wherein the UE is configured to determine that the one or more RACH slots are overlapped with the one or more reference slots according to the SCS of the one or more RACH slots.

6. The method of claim 4, wherein when the SCS of the one or more reference slots is equal to 60 kHz and the SCS of the one or more RACH slots is equal to 120 kHz, one reference slot length corresponds to 32 RACH slots, when the SCS of the one or more reference slots is equal to 120 kHz and the SCS of the one or more RACH slots is equal to 120 kHz, one reference slot length corresponds to 16 RACH slots, when the SCS of the one or more reference slots is equal to 60 kHz and the SCS of the one or more RACH slots is equal to 480 kHz, one reference slot length corresponds to 8 RACH slots, when the SCS of the one or more reference slots is equal to 120 kHz and the SCS of the one or more RACH slots is equal to 480 kHz, one reference slot length corresponds to 4 RACH slots, when the SCS of the one or more reference slots is equal to 60 kHz and the SCS of the one or more RACH slots is equal to 960 kHz, one reference slot length corresponds to 4 RACH slots, and/or when the SCS of the one or more reference slots is equal to 120 kHz and the SCS of the one or more RACH slots is equal to 960 kHz, one reference slot length corresponds to 2 RACH slots.

7. The method of claim 5, wherein when one reference slot corresponds to more than one RACH slot, the UE selects a part of slots as the one or more RACH slots within a reference slot range, wherein the part of the slots comprises a first or second half number of slots as the one or more RACH slots overlapping with the one or more reference slots, or wherein the part of slots comprises non-consecutive slots as the one or more RACH slots in time domain overlapping with the one or more reference slots.

8. The method of claim 1, wherein after determining the one or more RACH slots, the UE further determines one or more RACH occasions (ROs) by at least one of the following parameters: a first RO starting symbol, a RO duration, or a number of RO in one RACH slot.

9. A wireless communication method, performed by a base station, comprising:

configuring a user equipment (UE) to determine one or more reference slots from one or more configured subframes based on a reference subcarrier spacing (SCS) of the one or more reference slots;

configuring the UE to determine one or more random access channel (RACH) slots from one or more reference slots based on a SCS of the one or more RACH slots; and controlling the UE to perform an initial access according to one or more determined RACH slots.

10. The method of claim 9, wherein the reference SCS is equal to at least one of the followings: 60 kHz, 120 kHz, 480 kHz, or 960 kHz, and wherein the reference SCS corresponds to an operational frequency range and the operational frequency range is equal to or greater than 52.6 GHz or equal to or less than 71 GHz.

11. The method of claim 9, wherein the one or more configured subframes in new radio (NR) have a pre-defined SCS equal to 15 kHz and wherein the one or more configured subframes are configured by the base station for RACH.

12. The method of claim 9, wherein the base station is configured to configure the UE to determine that the one or more reference slots are overlapped with the one or more configured subframes according to the reference SCS.

13. The method of claim 9, wherein the base station is configured to configure the UE to determine that the one or more RACH slots are overlapped with the one or more reference slots according to the SCS of the one or more RACH slots.

14. The method of claim 13, wherein when the SCS of the one or more reference slots is equal to 60 kHz and the SCS of the one or more RACH slots is equal to 120 kHz, one reference slot length corresponds to 32 RACH slots, when the SCS of the one or more reference slots is equal to 120 kHz and the SCS of the one or more RACH slots is equal to 120 kHz, one reference slot length corresponds to 16 RACH slots, when the SCS of the one or more reference slots is equal to 60 KHz and the SCS of the one or more RACH slots is equal to 480 kHz, one reference slot length corresponds to 8 RACH slots, when the SCS of the one or more reference slots is equal to 120 kHz and the SCS of the one or more RACH slots is equal to 480 kHz, one reference slot length corresponds to 4 RACH slots, when the SCS of the one or more reference slots is equal to 60 kHz and the SCS of the one or more RACH slots is equal to 960 kHz, one reference slot length corresponds to 4 RACH slots, and/or when the SCS of the one or more reference slots is equal to 120 kHz and the SCS of the one or more RACH slots is equal to 960 kHz, one reference slot length corresponds to 2 RACH slots.

15. The method of claim 13, wherein when one reference slot corresponds to more than one RACH slot, the base station controls the UE to select a part of slots as the one or more RACH slots within a reference slot range, wherein the part of the slots comprises a first or second half number of slots as the one or more RACH slots overlapping with the one or more reference slots, or wherein the part of slots comprises non-consecutive slots as the one or more RACH slots in time domain overlapping with the one or more reference slots.

16. The method of claim 9, wherein after determining the one or more RACH slots, the base station further configures the UE to determine one or more RACH occasions (ROs) by at least one of the following parameters: a first RO starting symbol, a RO duration, or a number of RO in one RACH slot.

17. A user equipment (UE), comprising:

a memory;

a transceiver; and a processor coupled to the memory and the transceiver;

wherein the processor is configured to;

determine one or more reference slots from one or more configured subframes based on a reference subcarrier spacing (SCS) of the one or more reference slots;

determine one or more random access channel (RACH) slots from one or more reference slots based on a SCS of the one or more RACH slots; and wherein the processor is configured to perform an initial access according to one or more determined RACH slots.

18. A base station, comprising:

a memory;

a transceiver; and a processor coupled to the memory and the transceiver;

wherein the processor is configured to;

configure a user equipment (UE) to determine one or more reference slots from one or more configured subframes based on a reference subcarrier spacing (SCS) of the one or more reference slots;

configure the UE to determine one or more random access channel (RACH) slots from one or more reference slots based on a SCS of the one or more RACH slots; and wherein the processor is configured to control the UE to perform an initial access according to one or more determined RACH slots.

* * * * *